(12) United States Patent
de Fresart et al.

(10) Patent No.: US 12,431,834 B2
(45) Date of Patent: Sep. 30, 2025

(54) MOUNTING RAIL

(71) Applicant: ARRAY TECH, INC., Albuquerque, NM (US)

(72) Inventors: Benjamin de Fresart, Chandler, AZ (US); Nathan Schuknecht, Golden, CO (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/047,904

(22) Filed: Feb. 7, 2025

(65) Prior Publication Data

US 2025/0253800 A1    Aug. 7, 2025

Related U.S. Application Data

(60) Provisional application No. 63/550,756, filed on Feb. 7, 2024.

(51) Int. Cl.
*H02S 20/20* (2014.01)
*F16M 13/02* (2006.01)

(52) U.S. Cl.
CPC ............. *H02S 20/20* (2014.12); *F16M 13/02* (2013.01)

(58) Field of Classification Search
CPC ......... H02S 20/20; H02S 20/30; F16M 13/02; F16L 3/133; F16L 3/1226; F16L 3/243; Y10T 24/1437
See application file for complete search history.

(56) References Cited

U.S. PATENT DOCUMENTS

| | | | | | |
|---|---|---|---|---|---|
| 3,604,676 | A | * | 9/1971 | Weber | F16L 3/1075 248/231.51 |
| 3,856,250 | A | * | 12/1974 | Farmer | H02K 5/00 248/219.4 |
| 3,919,747 | A | * | 11/1975 | Offterdinger | F01N 13/185 285/199 |
| 4,167,033 | A | * | 9/1979 | Fletcher | F21V 21/116 362/396 |
| 4,372,017 | A | * | 2/1983 | Heckethorn | F16L 25/04 24/459 |
| 4,403,378 | A | * | 9/1983 | Engman | F01N 13/1805 D8/396 |
| 4,489,463 | A | * | 12/1984 | Schafer | F01N 13/1805 24/20 R |
| 4,506,418 | A | * | 3/1985 | Viola | F01N 13/1855 24/284 |
| 5,274,888 | A | * | 1/1994 | Payne | F16L 3/02 248/74.1 |

(Continued)

OTHER PUBLICATIONS

First Solar; "Series 7—A High-Quality Thin Film CdTe Module Made in America, for America"; Webpage; located at: https://www.firstsolar.com/Products/Series-7; 2024; accessed on Jan. 15, 2025.

(Continued)

*Primary Examiner* — Ko H Chan
(74) *Attorney, Agent, or Firm* — MASCHOFF BRENNAN

(57) ABSTRACT

A mounting rail for securing photovoltaic (PV) modules to an underlying support structure, such as a torque tube. The mounting rail may include a body and a bracket that is attached to the body and configured to be secured around at least a portion of the support structure.

10 Claims, 9 Drawing Sheets

(56) References Cited

U.S. PATENT DOCUMENTS

| | | | |
|---|---|---|---|
| 6,768,474 B2 * | 7/2004 | Hunt | H01Q 1/1228 |
| | | | 343/890 |
| 9,683,681 B2 * | 6/2017 | Heath | F16L 3/08 |
| D804,407 S * | 12/2017 | Au | H02S 20/00 |
| | | | D13/102 |
| D905,626 S * | 12/2020 | Delgado-Nanez | D13/102 |
| 10,998,849 B2 | 5/2021 | Au | |
| 11,271,518 B2 * | 3/2022 | Ballentine | H02S 30/00 |
| 11,371,652 B1 * | 6/2022 | Walker | F16M 11/04 |
| 11,502,638 B2 * | 11/2022 | Watson | F24S 30/425 |
| 11,962,269 B2 | 4/2024 | Creasy et al. | |
| 12,074,559 B2 | 8/2024 | Schuknecht et al. | |
| 12,278,592 B2 * | 4/2025 | Creasy | B21D 28/26 |
| 2012/0001041 A1 * | 1/2012 | Yang | H05K 5/0204 |
| | | | 248/219.4 |
| 2012/0073219 A1 * | 3/2012 | Zuritis | F24S 25/12 |
| | | | 52/173.3 |
| 2014/0246549 A1 * | 9/2014 | West | H02S 20/23 |
| | | | 248/220.22 |
| 2015/0144747 A1 * | 5/2015 | Castellanos | F16L 3/1218 |
| | | | 248/74.1 |
| 2015/0187975 A1 | 7/2015 | Wares et al. | |
| 2016/0365827 A1 * | 12/2016 | Au | F16B 5/0621 |
| 2019/0341878 A1 * | 11/2019 | Watson | F24S 30/40 |
| 2022/0190778 A1 * | 6/2022 | Worden | F16M 13/02 |
| 2022/0271706 A1 * | 8/2022 | Creasy | H02S 30/10 |
| 2023/0246589 A1 | 8/2023 | Morankar et al. | |
| 2023/0402963 A1 | 12/2023 | Yadlapalli et al. | |
| 2024/0039459 A1 | 2/2024 | Schuknecht et al. | |

OTHER PUBLICATIONS

European Patent Office; International Search Report and Written Opinion issued in PCT App. No. PCT/2025/014942 dated May 15, 2025; 10 pages.

* cited by examiner

MOUNTING RAIL

CROSS-REFERENCE TO RELATED APPLICATION

This application claims priority under 35 U.S.C. § 119 to U.S. Provisional Application No. 63/550,756, filed Feb. 7, 2024, the entire disclosure of which is incorporated herein by reference.

BACKGROUND

Mounting rails are often used to secure photovoltaic (PV) modules to an underlying support structure, such as a torque tube. Due to the weight of the PV modules, environmental conditions such as wind, and seismic activities at installation locations, the mounting rails often experience a significant amount of stress. In order to avoid failure, mounting rails must be sufficiently strong to withstand these stresses. However, to be an economically practical, mounting rails must also make efficient use of materials.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional mounting rails, including problems associated with rail failure from stresses and high costs of mounting rails, by providing a mounting rail that is both strong and economical to manufacture.

In one embodiment, a mounting rail is provided that includes a body and a bracket that is attached to the body and configured to be secured around at least a portion of a support structure, such as a torque tube. In this embodiment, the body may include a first side wall having a top edge and a bottom edge, with the bottom edge defining a first cut-out section. The body may also include a first top flange extending from at least a portion of the top edge of the first side wall in a direction that is approximately orthogonal to the first side wall. The body may also include a second side wall having a top edge and a bottom edge, with the bottom edge defining a second cut-out section. The body may also include a second top flange extending from at least a portion of the top edge of the second side wall in a direction that is approximately orthogonal to the second side wall. In some embodiments, the first and second top flanges may extend in approximately opposite directions. The body may finally include a bottom structure connecting at least a portion of the bottom edge of the first side wall with at least a portion of the bottom edge of the second side wall to form a channel. This channel may have a consistent width that extends an entire length of the body or a portion thereof. The bottom structure may have a third cut-out section, with the first, second, and third cut-out sections combining to define an aperture that is configured to receive a portion of the support structure.

In some embodiments, the support structure may be a torque tube.

In some embodiments, the first and second top flanges may extend an entire length of the first and second side walls. In these embodiments, from a top down perspective, outside edges of the first and second top flanges may be wider at their end sections than at their middle sections.

In some embodiments, the bracket may be a U-bolt having threaded ends. In these embodiments, the threaded ends of the U-bolt may be inserted through holes defined in the bottom structure. The mounting rail may further include fasteners configured to secure the U-bolt to the bottom structure.

In some embodiments, the first top flange may include at least one module mounting hole and the second top flange may include at least one module mounting hole.

In some embodiments, the bracket may comprise a single continuous length of material. The bracket may have a circular cross-sectional shape.

In another embodiment, the bottom structure of the body may include a first tab and a second tab. In these embodiments, the first tab may include a third bracket hole and include a portion of the bottom structure that is a folded over onto itself so that the first and third bracket holes align. The second tab may include a fourth bracket hole and include a portion of the bottom structure that is a folded over onto itself so that the second and fourth bracket holes align. The bracket, in these embodiments, may be configured to be secured to the bottom structure of the body through the first, second, third, and fourth bracket holes.

In some embodiments, the first and second tabs may be square or rectangular in shape. For example, the first and second tabs may each have three cut sides with fourth sides attached to the bottom structure.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1A:
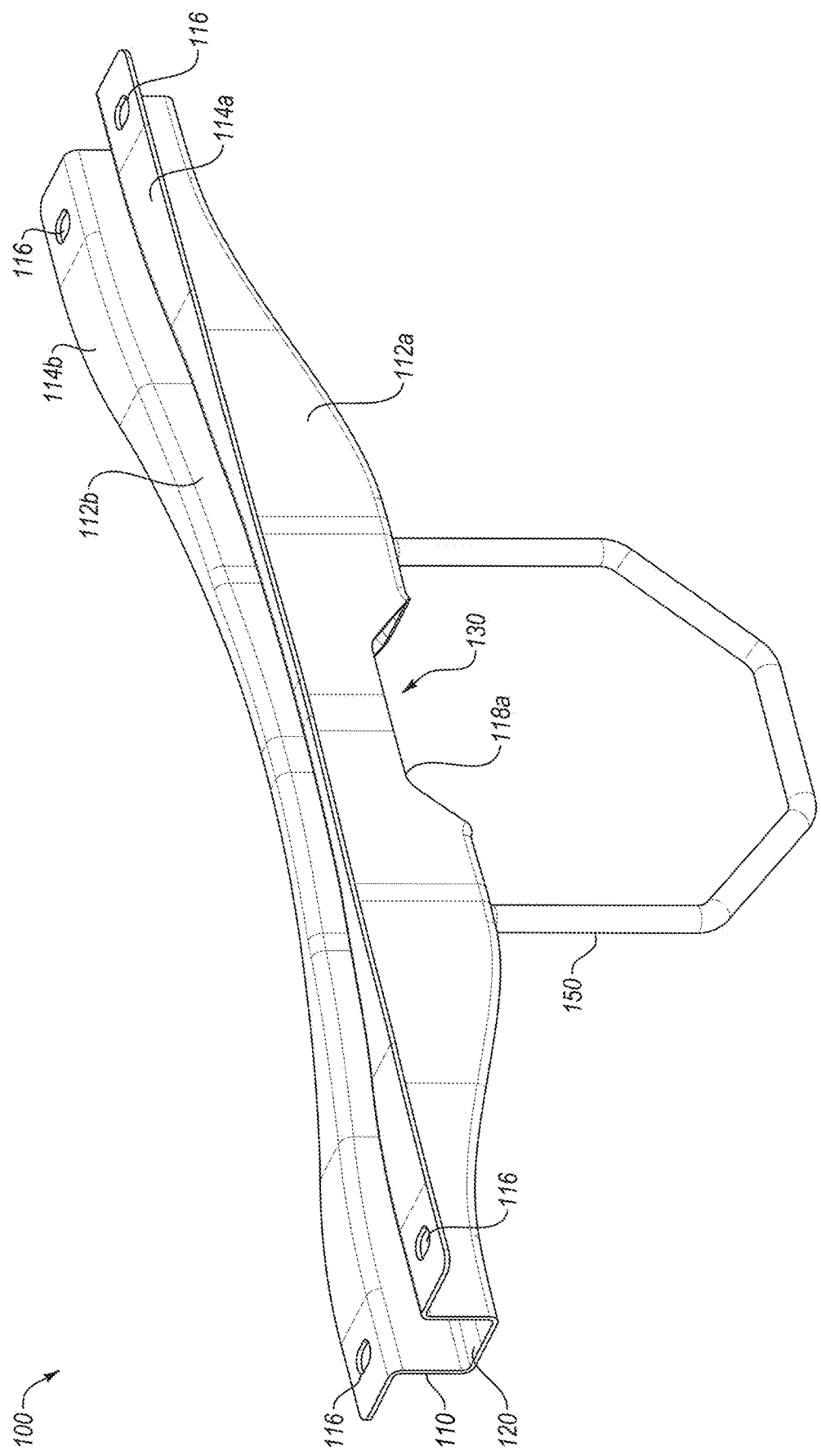
FIGS. 1A-1C illustrate a mounting rail according to one embodiment of the present disclosure.
Figure 1B:
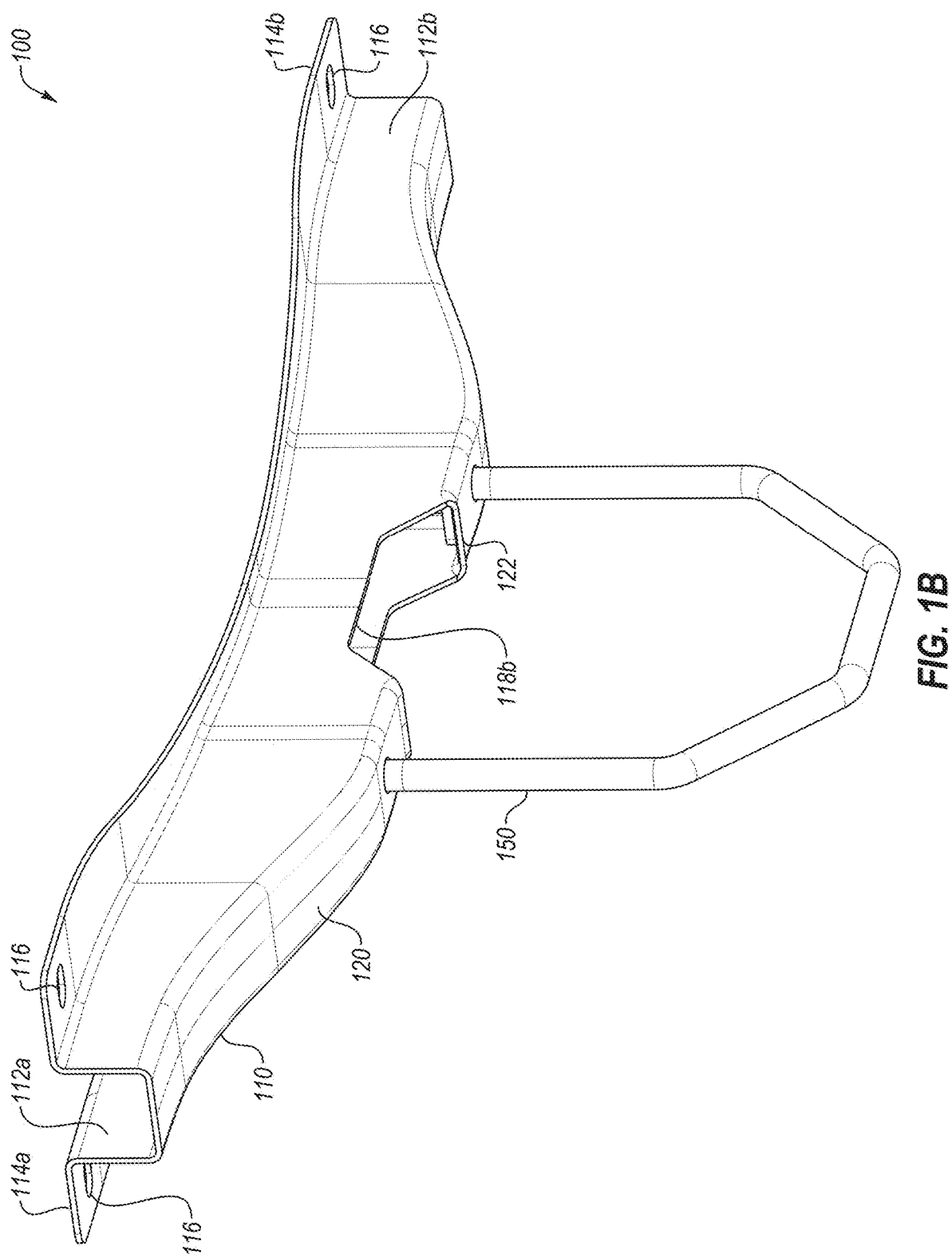
Figure 1C:
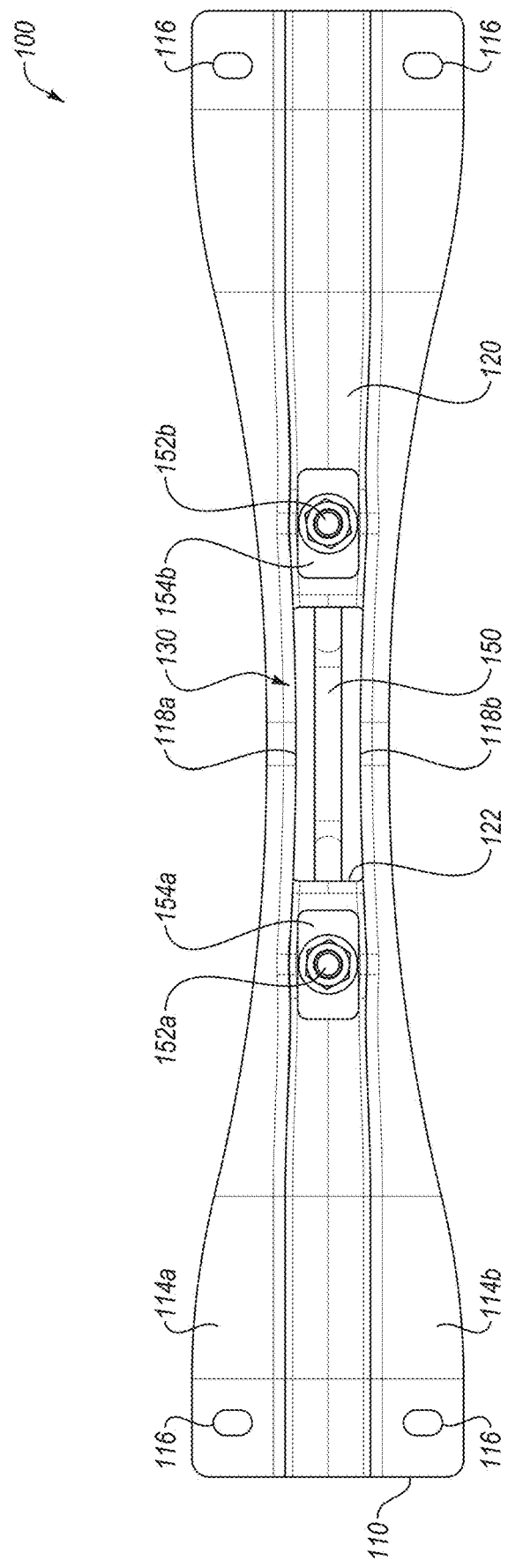

FIGS. 1A-1C illustrate different views of a mounting rail 100 according to one embodiment of the present disclosure. FIG. 1A illustrates a top perspective view of the mounting rail 100, FIG. 1B illustrates a bottom perspective view of the mounting rail 100, and FIG. 1C illustrates a top view of the mounting rail 100.

The mounting rail 100 includes a body 110 and a bracket 150. The body 110 includes a first side wall 112a, a second side wall 112b, and a bottom structure 120 that connects the first and second side walls 112a, 112b at a bottom edge of the first and second side walls 112a, 112b. The first side wall 112a includes a first top flange 114a that extends at approximately a right angle or orthogonal from the first side wall 112a. The width of the first top flange 114a is more narrow in a middle section and more wide at end sections of the body 110. The second side wall 112b includes a second top flange 114b that extends at approximately a right angle or orthogonal from the second side wall 112b. The width of the second top flange 114b is more narrow in a middle section and more wide at end sections of the body 110. In addition, the first and second side walls 112a and 112b are taller at their end sections than they are in their middle sections. Further, the first and second top flanges 114a and 114b are positioned on the same planes but extend in approximately opposite directions. In addition, as shown in FIGS. 1A-1C, the first and second side walls 112a and 112b may extend an entire length of the body 110. In other embodiments, first and second side walls may not extend an entire length of a body. Further, the channel may have a consistent width, or the distance between the side walls may be approximately consistent, throughout the entire length of the body.

As shown in FIGS. 1A-1C, the first and second top flanges 114a and 114b may extend the entire lengths of the top edges of the first and second side walls 112a and 112b. However, in other embodiments, flanges may not extend the entire lengths of the side walls to which they are attached. For example, in some embodiments, a side wall may have flanges toward the ends of the side wall, but not in a middle portion of the side wall. Further, the configuration of the flanges may but need not be the same on the first and second side walls. In some embodiments, flanges on opposite side walls may have different lengths, shapes, or positions.

The first and second top flanges 114a and 114b are configured to interface with a frame of a PV module to secure the PV module to the mounting rail 100. Mounting rails, according to the present invention, may be secured to PV modules in any number of different ways. For example, the mounting rail 100 includes module mounting holes 116, which may align with holes in a PV module frame. Bolts may be inserted through these aligned holes to secure the mounting rail 100 to a PV module. Other embodiments of mounting rails may use an attachment mechanism that does not require these module mounting holes 116.

The first side wall 112a includes a first cut-out section 118a. The first cut-out section 118a is along a bottom edge of the first side wall 112a. The first cut-out section 118a may have a shape that corresponds to an exterior surface of a support structure, such as a torque tube, on which the mounting rail 100 is configured to be mounted. The second side wall 112b includes a second cut-out section 118b. The second cut-out section 118b is along a bottom edge of the second side wall 112b. The second cut-out section 118b may have a shape that corresponds to an exterior surface of a support structure, such as a torque tube, on which the mounting rail 100 is configured to be mounted.

The bottom structure 120 connects portions of the bottom edge of the first side wall 112a with portions of the bottom edge of the second side wall 112b. The bottom structure 120 connects the first and second side walls 112a and 112b at approximately right angles along the bottom edges of the first and second side walls 112a and 112b, forming a channel between the first and second side walls 112a and 112b. This channel may extend the length of the body 110 of the mounting rail 100, as shown in FIGS. 1A-1C. In alternative embodiments, the channel may not extend the entire length of the body of a mounting rail.

The bottom structure 120 includes a third cut-out section 122. The third cut-out section may extend from one side of a bottom edge of the first side wall 112a to a bottom edge of the second side wall 112b such that the bottom structure 120 is separated into two separate pieces, separated by the third cut-out section 122.

The first, second, and third cut-out sections 118a, 118b, and 122 may combine to form an aperture 130 that is configured to receive a portion of a torque tube. From a top-down view, as shown in FIG. 1C, the aperture 130 may have a rectangular shape. However, from a side view, the aperture may have a shape that corresponds to an exterior surface of a torque tube. For example, the aperture 130 is shaped to receive a top portion of an octagonal shaped torque tube.

The bracket 150 is configured to be secured to a support structure by surrounding a portion of an exterior surface of the support structure, such as a torque tube. The bracket may have any size and cross-sectional shape. In the mounting rail 200, the bracket 150 is a wire form U-bolt with a circular cross-sectional shape. A portion of the bracket 150 may have a shape that is consistent with a shape of an exterior surface of the support structure that the bracket 150 is configured to surround. For example, the bracket 150 defines part of an octagonal shape and is configured to surround a portion of an octagonal shaped torque tube.

A bracket may be secured to the body of a mounting rail in a number of different ways. In the mounting rail 100, the bracket 150 may include threaded ends that are configured to extend through first and second bracket holes 126a and 126b (shown in FIG. 2C). Fasteners 152a and 152b may be secured to the threaded ends of the bracket 150 to secure the bracket 150 to the body 110 of the mounting rail 100. Washers 154a and 154b are positioned between the fasteners 152a and 152b. While the washers 154a and 154b have rectangular shapes, any shape of washer may be used. In some embodiments, a washer may be omitted altogether.

Figure 2A:
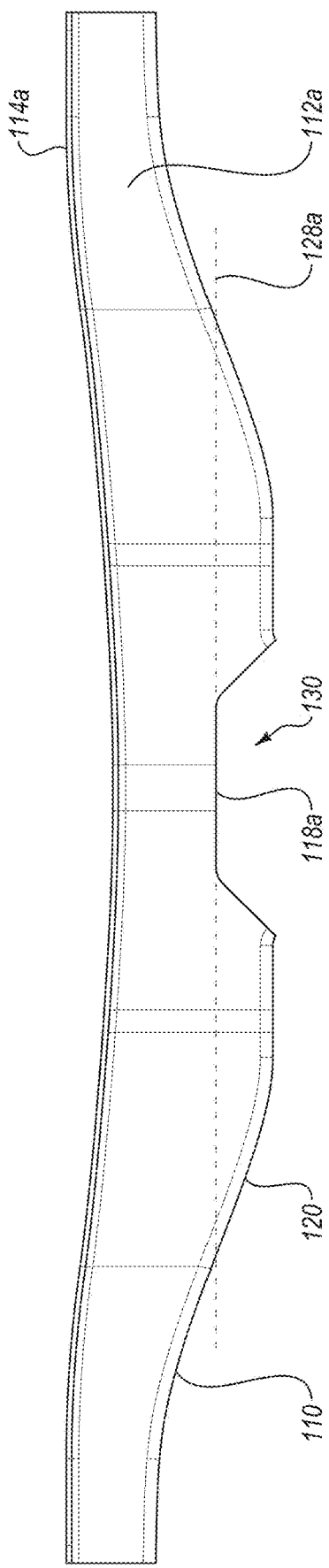
FIGS. 2A-2C illustrate the body of the mounting rail shown in FIGS. 1A-1C.
Figure 2B:
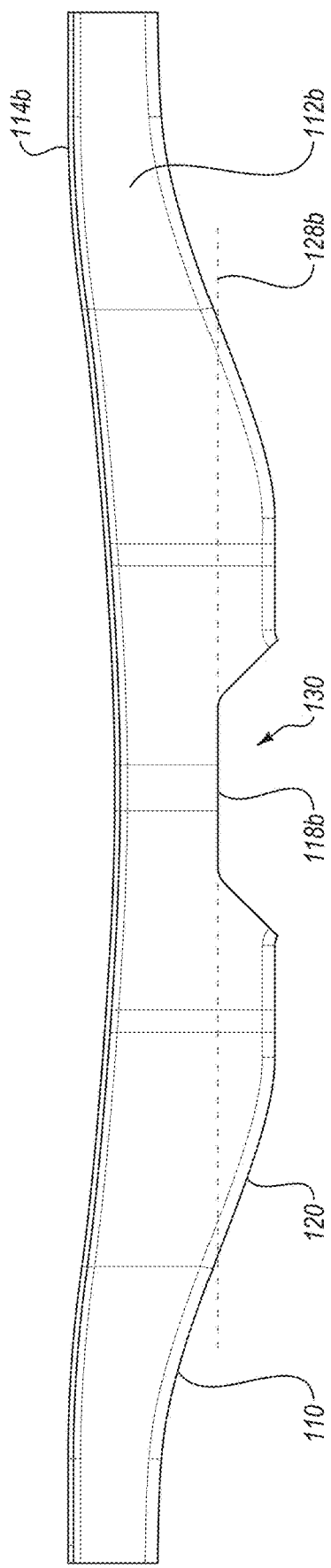
Figure 2C:
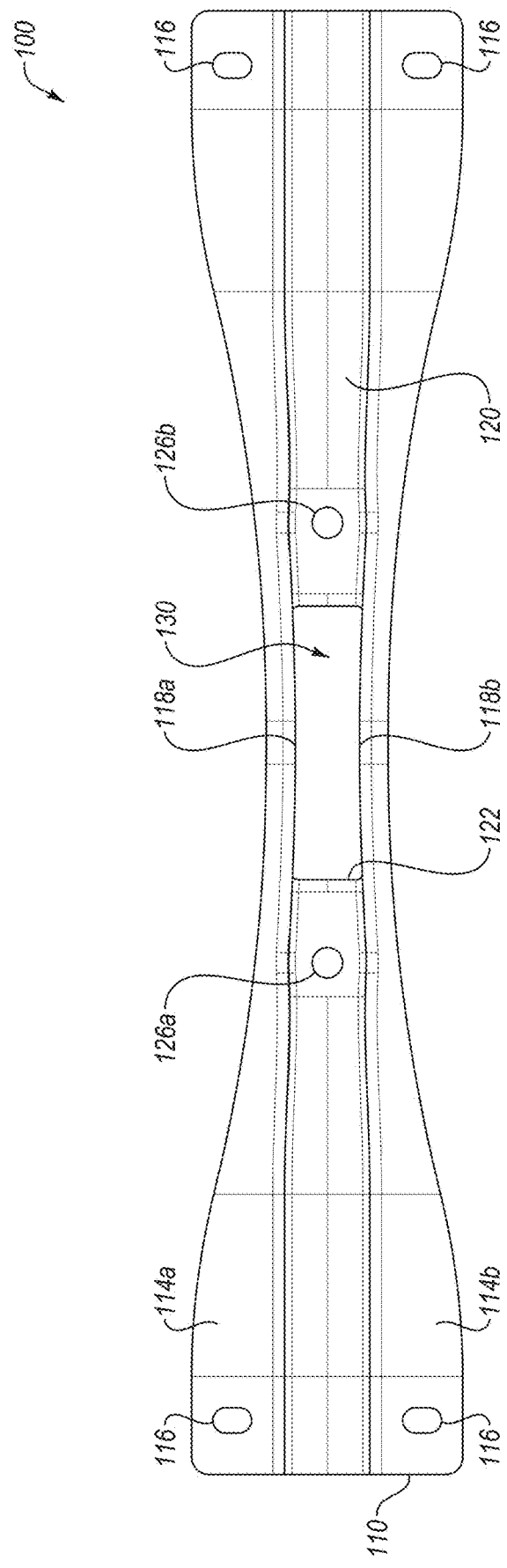

FIGS. 2A-2C illustrate the body 110 of the mounting rail 100 shown in FIGS. 1A-1C. FIG. 2A shows a first side of the body 110, FIG. 2B shows a second side of the body 110, and FIG. 2C shows a top view of the body 110.

As can be seen in FIG. 2A, a top edge of the first cut-out section 118a extends to a level identified by the dashed line 128a. As can be seen in FIG. 2B, a top edge of the second cut-out section 118b extends to a level identified by the dashed line 128b. FIG. 2C illustrates the first and second bracket holes 126a and 126b, which are on opposite sides of the third cut-out section 122. The bracket holes are positioned on the bottom structure 120 at a location that is below both the level 128a of a top edge of the first cut-out section 118a and the level 128b of a top edge of the second cut-out section 118b. While the levels 128a and 128b of the first and second cut-out sections 118a and 118b are on the same plane, in other embodiments, levels of top edges of cut-out sections may be different.

In some embodiments, the components of the body 110 may be manufactured from a single piece of material, such as metal. For example, the bottom structure 120 and the first and second side walls 112a and 112b, including the first and second top flanges 114a and 114b, may be part of a single piece of metal that has been bent into shape.

Figure 3:
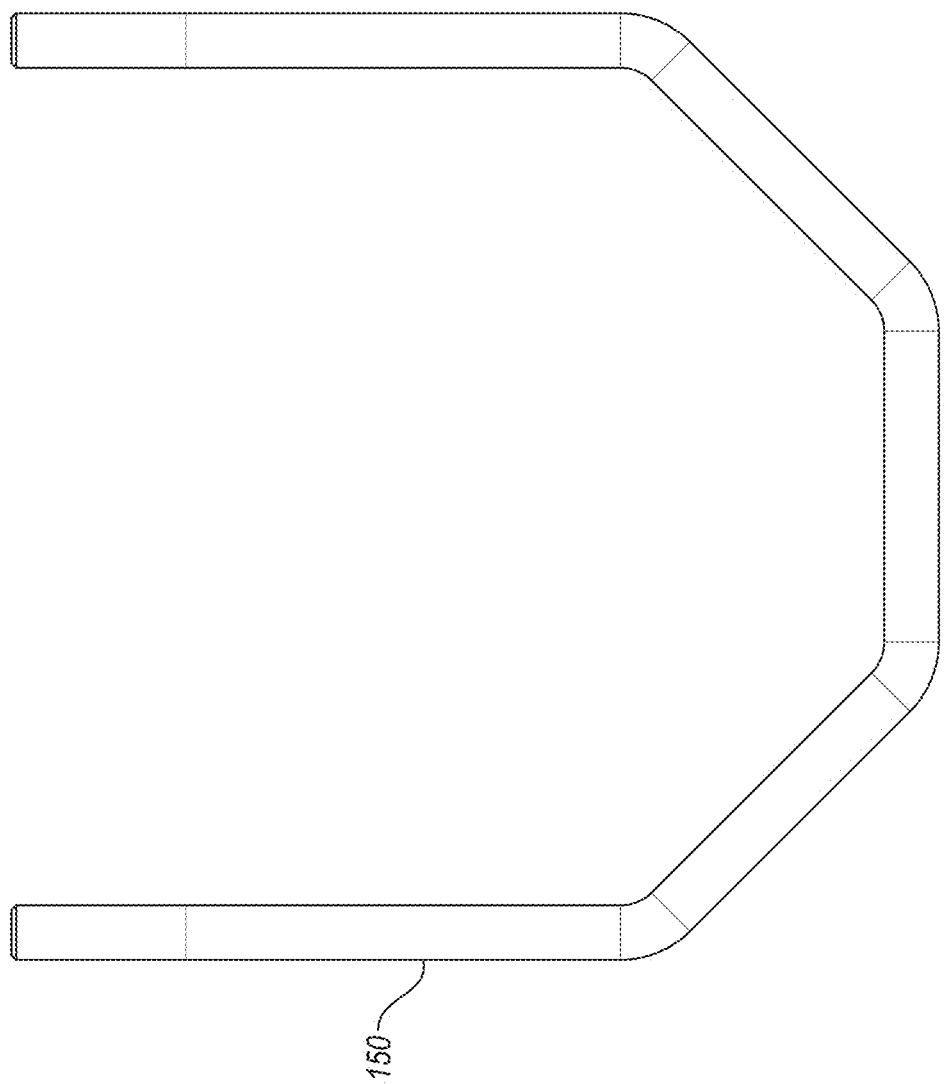
FIG. 3 illustrates the bracket of the mounting rail shown in FIGS. 1A-1C.

FIG. 3 illustrates the bracket 150. The ends of the bracket 150 may include features that may be configured to interface with a fastener. For example, ends of the bracket 150 may be threaded such that a threaded nut may be used to secure the bracket 150 to the body 110 of the mounting rail 100. The bracket 150 includes a single continuous length of material. In other words, the bracket 150 does not include any breaks or separate pieces. In alternative embodiments, a bracket may include a first length and a second length that are connectable in order to secure the bracket to a support structure.

Figure 4:
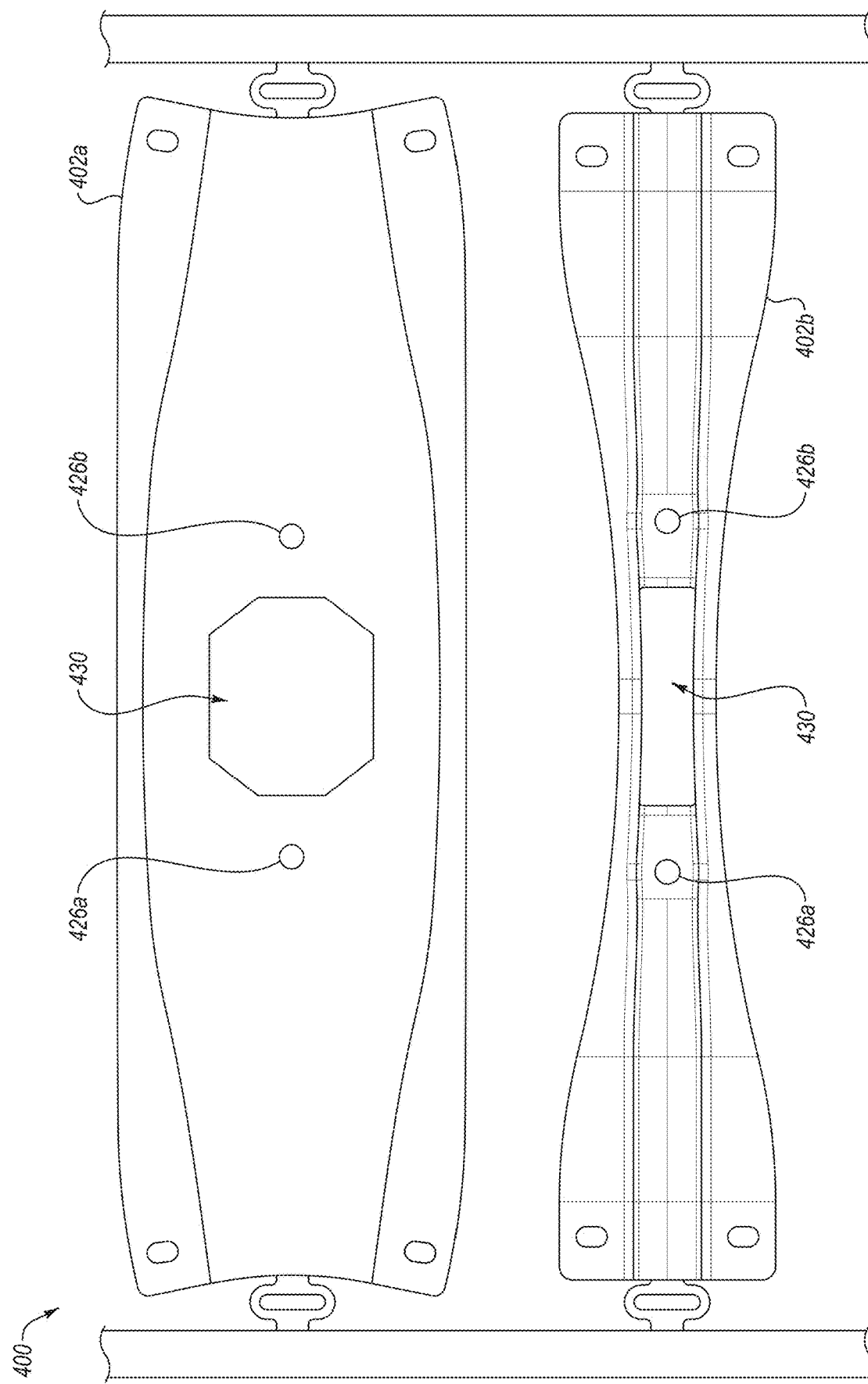
FIG. 4 illustrates a flat pattern shape that may be used to form an example mounting rail in a manufacturing process, according to at least one embodiment of the present disclosure.

FIG. 4 illustrates a flat pattern sheet 400 that may be used to form mounting rail bodies of the present disclosure. The flat pattern sheet 400 includes two mounting rail bodies 402a and 402b. The first mounting rail body 402a is flat while the second mounting rail body 402b has been formed into the shape of a mounting rail body via a die stamping process or other manufacturing process.

The mounting rail bodies include apertures 430. Prior to being formed into the shape of a final mounting rail body, the aperture 430 has an octagonal shape that is configured to be mounted on a torque tube or other support structure having an octagonal shape. Any shape is possible including circles, ovals, or other polygons. The mounting rail bodies also include bracket holes 426a and 426b.

A die stamping process may include a sheet coil that may be cut into one or more of the flat pattern mounting rail bodies, such as body 402a. The die stamping process may include feeding the sheet coil to a first machine that cuts the sheet coil to form one or more of the flat pattern sheets. In some embodiments, cutting the sheet coil to form a given flat pattern sheet may involve cutting the sheet coil a first distance along a length of the sheet coil to form width-wise sides of the given flat pattern sheet and a second distance along a width of the sheet coil to form length-wise sides of the given flat pattern sheet. The first distance that the sheet coil is cut along its length may correspond to a size of the given flat pattern sheet along its width-wise sides, and the second distance may correspond to a size of the given flat pattern sheet along its length-wise sides.

Each of the flat pattern sheets may be processed to punch out or otherwise form one or more of the bracket holes 426a, 426b, and aperture 430. The flat pattern sheets may be additionally processed to bend the flat pattern sheets to form mounting rail bodies, such as the walls and flanges.

While an example is provided of one order of operations to manufacture a module clamp, it will be appreciated that these operations may be performed in varying order. For example, the flat pattern sheets may be folded first and then have features cut out after the flat pattern sheet is folded. As another example, the flat pattern sheet 310 may have features cut out and then folded afterwards. Additionally or alternatively, such operations may be iteratively repeated or occur in any order. For example, one fold may be made, followed by one feature being cut out, followed by an additional fold being made, followed by another feature being cut out, etc.

Figure 5:
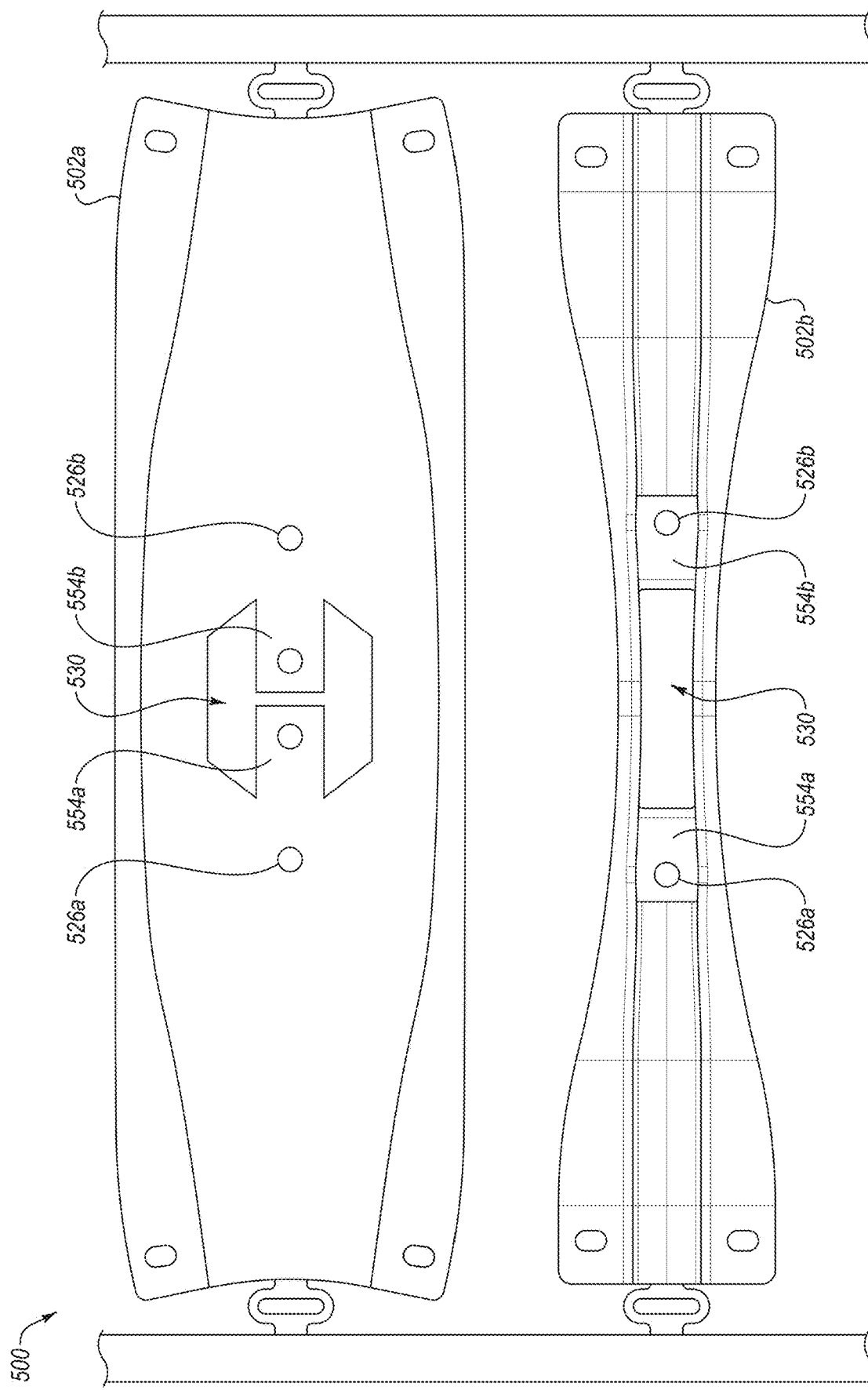
FIG. 5 illustrates another flat pattern shape that may be used to form an example mounting rail in a manufacturing process, according to at least one embodiment of the present disclosure.

FIG. 5 illustrates another flat pattern sheet 500 that may be used to form mounting rail bodies of the present disclosure. The flat pattern sheet 500 is similar to flat pattern sheet 400 and includes two mounting rail bodies 502a and 502b. The first mounting rail body 502a is flat while the second mounting rail body 502b has been formed into the shape of a mounting rail body via a die stamping process or other manufacturing process.

The mounting rail bodies include bracket holes 526a and 526b, and an aperture 530. In the flat pattern sheet 500, first and second tabs 554a and 554b can be seen, which may alter the shape of the aperture 530. The first and second tabs 554a and 554b also include bracket holes that are similar in size and shape to the bracket holes 526a and 526b.

During the folding process on the flat pattern sheet 500, the first and second tabs 554a and 554b may be bent or folded back over such that the bracket holes in the first and second tabs 554a and 554b align with the bracket holes 526a and 526b. In this embodiment, the first and second tabs 554a and 554b act as the washers for a nut and bolt that are secured to the resulting mounting rail body and increase the strength of the mounting rail body at the connection points to a bracket. Once the first and second tabs 554a and 554b are folded back, the aperture 530 may be configured to be mounted on a torque tube or other support structure having an octagonal shape.

The first and second tabs 554a and 554b may have any shape or size. The first and second tabs 554a and 554b may be square or rectangular in shape and have three sides with a fourth side remaining attached to the bottom structure of the mounting rail. When the first and second tabs 554a and 554b are folded back, they completely surround the bracket holes 526a and 526b and the bracket holes in the first and second tabs 554a and 554b align with the bracket holes 526a and 526b.

There is a material usage benefit associated with forming the first and second tabs 554a and 554b as part of the sheet 500 and reducing the size of the aperture 530. In embodiments where tabs are not formed as part of the sheet (such as with the sheet 400), the amount of scrap material (i.e. the size of the aperture cut out) is larger and separate washers may need to be acquired.

What is claimed is:

1. A mounting rail comprising:
 a body including:
   a first side wall having a top edge and a bottom edge, the bottom edge defining a first cut-out section;
   a first top flange extending from at least a portion of the top edge of the first side wall in a direction that is approximately orthogonal to the first side wall;
   a second side wall having a top edge and a bottom edge, the bottom edge defining a second cut-out section;
   a second top flange extending from at least a portion of the top edge of the second side wall in a direction that is approximately orthogonal to the second side wall, wherein the first and second top flanges extend in approximately opposite directions; and
   a bottom structure connecting at least a portion of the bottom edge of the first side wall with at least a portion of the bottom edge of the second side wall to form a channel having a consistent width that extends an entire length of the body such that the channel is open on opposite ends of the body, the bottom structure having a third cut-out section, wherein the first, second, and third cut-out sections combine to define an aperture that is configured to receive a portion of a support structure; and
 a bracket secured to the body that is configured to be secured around at least a portion of the support structure.

2. The mounting rail of claim 1, wherein the support structure is a torque tube.

3. The mounting rail of claim 1, wherein:
the first and second top flanges extend an entire length of the first and second side walls; and
from a top down perspective, outside edges of the first and second top flanges are wider at their end sections than at their middle sections.

4. The mounting rail of claim 1, wherein the bracket is a U-bolt having threaded ends.

5. The mounting rail of claim 4, wherein the threaded ends of the U-bolt are inserted through holes defined in the bottom structure.

6. The mounting rail of claim 5, further comprising fasteners configured to secure the U-bolt to the bottom structure.

7. The mounting rail of claim 1, wherein:
the first top flange includes at least one module mounting hole; and
the second top flange includes at least one module mounting hole.

8. A mounting rail comprising:
a body including:
a first side wall having a top edge and a bottom edge, the bottom edge defining a first cut-out section;
a first top flange extending from at least a portion of the top edge of the first side wall in a direction that is approximately orthogonal to the first side wall, the first top flange having at least one module mounting hole;
a second side wall having a top edge and a bottom edge, the bottom edge defining a second cut-out section;
a second top flange extending from at least a portion of the top edge of the second side wall in a direction that is approximately orthogonal to the second side wall, the second top flange having at least one module mounting hole, wherein the first and second top flanges extend in approximately opposite directions; and
a bottom structure connecting at least a portion of the bottom edge of the first side wall with at least a portion of the bottom edge of the second side wall to form a channel that extends at least a portion of a length of the body, the bottom structure having a first bracket hole, a second bracket hole, a first tab, a second tab, and a third cut-out section, wherein:
the first, second, and third cut-out sections combine to define an aperture that is configured to receive a portion of a support structure,
the first tab includes a third bracket hole and comprises a portion of the bottom structure that is a folded over onto itself so that the first and third bracket holes align, and
the second tab includes a fourth bracket hole and comprises a portion of the bottom structure that is a folded over onto itself so that the second and fourth bracket holes align; and
a bracket configured to be secured to the bottom structure of the body through the first, second, third, and fourth bracket holes, the bracket configured to be secured around at least a portion of the support structure.

9. The mounting rail of claim 8, wherein the first and second tabs are square or rectangular in shape.

10. The mounting rail of claim 8, wherein the first and second tabs each have three cut sides with fourth sides attached to the bottom structure.

* * * * *